United States Patent
Stahl et al.

(10) Patent No.: US 10,040,720 B2
(45) Date of Patent: Aug. 7, 2018

(54) THERMALLY INSULATING AEROGEL BASED RENDERING MATERIALS

(71) Applicants: EMPA Eidgenossische Materialprufungs- Und Forschungsanstalt, Dubendorf (CH); Fixit AG, Baar (CH)

(72) Inventors: Thomas Stahl, Dubendorf (CH); Samuel Brunner, Dubendorf (CH); Mark Zimmermann, Dubendorf (CH); Matthias Koebel, Bruttisellen (CH)

(73) Assignees: EMPA Eidgenössische Materialprüfungs-Und Forschungsanstalt (CH); FixIt AG (CH)

( * ) Notice: Subject to any disclaimer, the term of this patent is extended or adjusted under 35 U.S.C. 154(b) by 0 days.

(21) Appl. No.: 14/650,721

(22) PCT Filed: Dec. 10, 2013

(86) PCT No.: PCT/EP2013/076061
§ 371 (c)(1),
(2) Date: Jun. 9, 2015

(87) PCT Pub. No.: WO2014/090790
PCT Pub. Date: Jun. 19, 2014

(65) Prior Publication Data
US 2016/0083295 A1  Mar. 24, 2016

(30) Foreign Application Priority Data
Dec. 11, 2012  (EP) .................... 12196505

(51) Int. Cl.
| | | |
|---|---|---|
| *C04B 14/06* | (2006.01) | |
| *C04B 28/02* | (2006.01) | |
| *C04B 14/16* | (2006.01) | |
| *C04B 16/06* | (2006.01) | |
| *C04B 28/04* | (2006.01) | |
| *C04B 28/12* | (2006.01) | |
| *C04B 111/00* | (2006.01) | |

(52) U.S. Cl.
CPC ............ *C04B 14/064* (2013.01); *C04B 14/16* (2013.01); *C04B 16/0625* (2013.01); *C04B 28/02* (2013.01); *C04B 28/04* (2013.01); *C04B 28/12* (2013.01); *C04B 2111/00482* (2013.01); *C04B 2201/32* (2013.01)

(58) Field of Classification Search
CPC ... C04B 14/064; C04B 14/16; C04B 16/0625; C04B 28/02; C04B 28/04; C04B 28/12
See application file for complete search history.

(56) References Cited

FOREIGN PATENT DOCUMENTS

| | | |
|---|---|---|
| DE | 44 37 424 A1 | 4/1996 |
| DE | 195 33 564 A1 | 3/1997 |
| EP | 0 489 319 A2 | 6/1992 |
| EP | 2 597 072 A2 | 5/2013 |
| WO | WO 2010/126792 A1 | 11/2010 |
| WO | WO 2011/066209 A2 | 6/2011 |
| WO | WO 2011/083174 A1 | 7/2011 |

OTHER PUBLICATIONS

Smimova, I., Suttiruengwong, S., and Arlt, W., Aerogels: Tailor-made Carriers for Immediate and Prolonged Drug Release, KONA No. 23 (2005) pp. 86-97.
Pidhurne, J and Pescatore, P., Cabot Corporation, Aerogel for Highly Thermally Insulative Coatings, http://www.cabot-corp.com/wcm/download/enus/unknown/ Jun. 2012 CoatingsTec.

*Primary Examiner* — Edward J Cain
(74) *Attorney, Agent, or Firm* — George Pappas

(57) ABSTRACT

In order to produce a high performance thermally insulating rendering, a dry blend is provided that consists essentially of: —60 to 90 Vol.-% of a hydrophobized granular silica aerogel; —0.5 to 30 Vol.-% of a purely mineral binder; —0.2 to 20 Vol.-% of an open-porous water-insoluble or slowly water soluble additive having an accessible pore volume from 10 to 90 Vol.-%; —up to 5 Vol.-% reinforcing fibers; and—up to 5 Vol.-% of processing additives. After mixing the dry blend with water, the slurry thus formed can be applied to a surface or shaped to a self-supporting body using an overpressure without adversely affecting the thermal insulation properties.

4 Claims, 1 Drawing Sheet

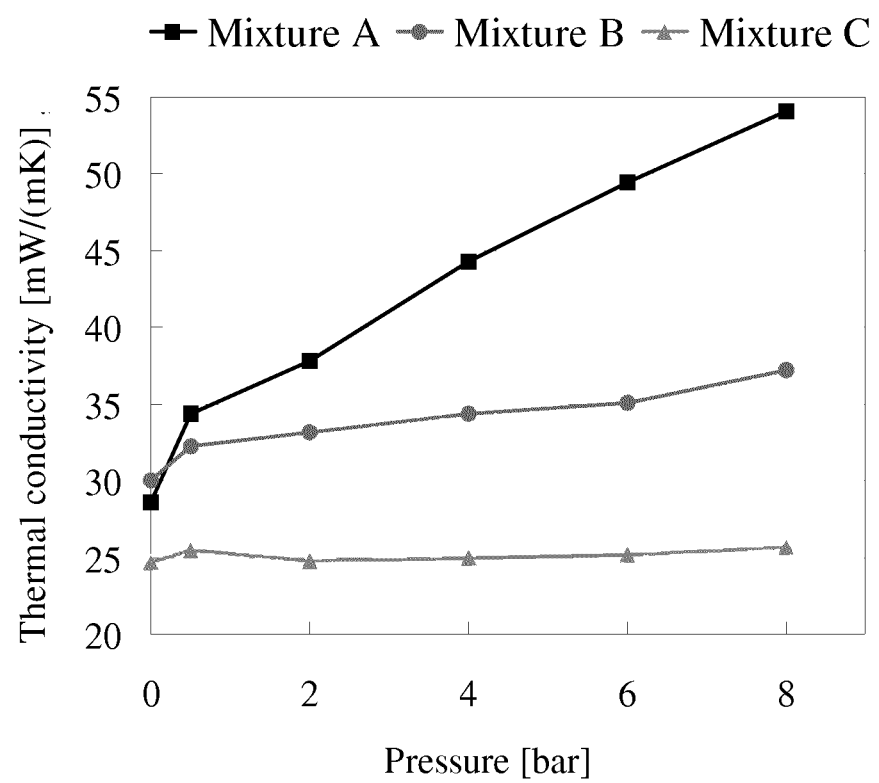

THERMALLY INSULATING AEROGEL BASED RENDERING MATERIALS

This application claims priority from PCT application No. PCT/EP2013/076061 filed Dec. 10, 2013 which claims priory from European application No. EP 12196505.7 filed on Dec. 11, 2012, the disclosures of which are incorporated herein by reference.

FIELD OF THE INVENTION

The present invention generally relates to the field of thermally insulating rendering materials. In particular, the invention relates to a dry blend for producing a thermally insulating rendering which can be applied by a plastering machine. Moreover, the invention relates to a self-supporting, thermally insulating rendering and to a method for producing a shaped element of said self-supporting, thermally insulating rendering.

BACKGROUND OF THE INVENTION

Retrofitting of old and historical buildings with respect to their energy consumption has been carried out in various countries mainly by applying a thermal insulation layer either on the external or the internal wall surfaces, depending on the requirements for maintaining style and shape of the façades. For this special application high performance thermal insulation materials such as vacuum insulation panels (VIP) or fiber reinforced aerogel mats have a remarkable asset due to the reduced thickness needed to achieve a required thermal performance. However, these insulations need a plane subsurface, adjustment, gluing and even fastening by means of dowels or have to be produced in precise dimensions.

A different way to insulate buildings is the application of an insulating rendering. A rendering has the advantage of being easily applicable, flexible with respect to surface unevenness and able to fill any gaps in order to provide a continuous thermal insulation layer. So far existing insulation renderings do not reach a thermal conductivity value below 65 mW m$^{-1}$ K$^{-1}$, which represents a clear disadvantage compared to the above mentioned high performance insulation materials with a thermal conductivity clearly below 30 mW m$^{-1}$ K$^{-1}$. Besides, the typical density of presently used insulation renderings of about 350 kg m$^{-3}$ does not allow thicknesses beyond 4 to 5 cm without recurring to fixation elements.

In view of the above, it has been proposed in WO 2011/083174 to use an insulating plaster material based on a silica xerogel. This plaster material comprises water, a mineral and/or organic hydraulic binder, optionally a structuralizing filler and additives; moreover it comprises an insulating filler comprising a powder or granules of at least one hydrophobic silica xerogel. In one example, the plaster material produced in a laboratory mixer had a thermal conductivity of about 34 mW m$^{-1}$ K$^{-1}$.

Similarly, WO 2011/066209 discloses various thermally insulating composites, including a self-supporting rigid composite that includes an aerogel-containing material and a binder, particularly a cementitious binder. In some examples, low thermal conductivities not exceeding 20 mW m$^{-1}$ K$^{-1}$ were achieved. The samples of thermally insulating composite material were prepared by pouring an aqueous slurry in a suitably shaped mold and allowed to dry.

WO 2010/126792 A1 discloses dry blends for producing a composite in the form of a coating. The blends comprise hydrophobic aerogel particles, a surfactant, a binder, fibers and further ingredients. Such possible ingredients comprise silica, perlite, microspheres of glass or polymers and many others.

However, there is still a need for improved thermally insulating rendering or plaster materials. In particular, a rational use of any insulating render unavoidably requires the applicability by means of a plastering machine. In this respect it has been found that the thermal conductivity markedly increases (the insulation performance deteriorates) when samples were produced by a plastering machine as compared to manually produced samples. This performance loss appears to be caused by the overpressure in the plastering machine, as the decrease in thermal insulation was found to be more pronounced with increasing pressure between 0 and 8 bar (relative to atmospheric pressure).

Therefore, it would be desirable to have an improved rendering material having excellent thermally insulating properties, being capable of forming self-supporting elements or layers, and being suitable for application by a plastering machine.

SUMMARY OF THE INVENTION

It has now been recognized that the above requirements and further advantageous properties are achieved by means of a dry blend, by a self-supporting, thermally insulating rendering and by a method for producing such an element.

According to one aspect of the invention, there is provided a dry blend for producing a thermally insulating rendering, consisting essentially of:
  60 to 90 Vol.-% of a hydrophobized granular silica aerogel;
  0.5 to 30 Vol.-% of a purely mineral binder;
  0.2 to 20 Vol.-% of an open-porous water-insoluble or slowly water soluble additive having an accessible pore volume from 10 to 90 Vol.-%;
  up to 5 Vol.-% reinforcing fibers; and
  up to 5 Vol.-% processing additives.

It shall be understood that in the composition, the volume percentages of the various components listed therein shall add up to essentially 100%, the term "essentially" meaning that allowance shall be made for minor amounts of up to 1 Vol.-%, preferably of up to 0.5 Vol.-%, of any further components that are usually present in dry blends for producing renderings, e.g. unavoidable impurities and other trace components, as well as residual moisture.

The term "processing agent" shall be understood as any additives that provide improved handling and/or stability to the dry blend itself and/or to the thermally insulating rendering produced therefrom. As generally known in the art, such processing agents may comprise a hydrophobizing agent, i.e. an additive which can alter a composition to become more hydrophobic or water repellant. Such hydrophobizing agents include, but are not limited to, a variety of organosilane compounds. A further type of processing agents are dispersing agents, which serve to improve the separation of particles and to prevent settling or clumping. Such dispersing agents include, but are not limited to, a variety of carboxylic acids, e.g. citric acid or vinyl acetate copolymers.

As is generally known, aerogels are solid materials with high porosity and surface area, low density and other interesting mechanical and non-mechanical properties. The term "hydrophobized granular silica aerogel" refers to a material comprising silica aerogel particles treated with a suitable hydrophobizing agent. Silica aerogels can be obtained from a variety of commercial sources. They are usually synthesized by hydrolysis and subsequent condensation of tetraalkylorthosilicates. The condensation leads to the formation of a gel phase which is subsequently converted to an aerogel by removing the solvent. The pore size and surface area of aerogel materials can be tailored over a large rang. The hydrophobicity of silica aerogels varies from completely hydrophilic aerogels, whose structure collapses immediately in water, to hydrophobic samples, which float on water for many hours without being wetted (I. Smirnova et al., *Aerogels: Tailor-made Carriers for Immediate and Prolonged Drug Release*, KONA 23 (2005), 86-97).

The term "purely mineral binder" as generally known in the art and shall be understood as a purely mineral material suitable to bind other materials together. Examples include, but are not limited to, cement, lime and gypsum.

In the present context, the term "open-porous water-insoluble or slowly water soluble additive" shall be understood as a granular composition consisting of open-porous particles to be included in the dry blend, with the requirement that the additive shall be either water insoluble or slowly water soluble. By "slowly water soluble" is meant that dissolution in water occurs on a substantially slower time scale than the hardening process leading to formation of a shaped element as defined above. In other words, "slowly water soluble" shall refer to an additive dissolving on a time scale of several weeks or longer. As generally known, the accessible pore volume of a porous particle is essentially the volume space that is accessible for a fluid from outside of the particle. The accessible pore volume can be determined e.g. by the mercury intrusion method.

It has been found that the presence of 0.2 to 20 Vol.-% of an open-porous water-insoluble or slowly water soluble additive having an accessible pore volume from 10 to 90 Vol.-% is of decisive importance for a dry blend that is suitable for application by means of a plastering machine using a substantial overpressure and thereby allowing formation of a self-supporting, thermally insulating rendering having a thermal conductivity not exceeding 38 mW m$^{-1}$ K$^{-1}$.

Therefore, it would be desirable to have an improved rendering material having excellent thermally insulating properties, being capable of forming self-supporting elements or layers, and being suitable for application by a plastering machine.

The term "reinforcing fibers" is generally known in the art and may comprise any fibrous material to be incorporated in a rendering to provide structural reinforcement thereof. Particularly suitable examples of reinforcing fibers are natural fibers, mineral fibers and organic fibers such as e.g. polyethylene or polypropylene fibers.

According to an advantageous embodiment, the open-porous additive has a particle size distribution ranging from 0.04 to 4 mm. This means that the vast majority, e.g. at least 95% by weight, of the additive particles have a size within said range. In a preferred embodiment, the open-porous additive has a particle size ranging from 0.5 to 1.5 mm. There are a number of substances that are suitable as additives for the present invention which can be purchased in particulate form having a requested "grading curve" or "sieve curve", i.e. a certain distribution of particle sizes. These embodiments are particularly useful regarding processability, notably in a plastering machine.

According to a further embodiment, the open-porous additive has an accessible pore volume ranging from 45 to 55 Vol.-%.

In principle, there is a large variety of inorganic and organic materials that can be contemplated as suitable open-porous additives in the sense of the present invention.

According to a preferred embodiment, the open-porous additive is hydrophilic, i.e. has a water contact angle between 0° and less than 90°. Alternatively, it is possible to use a hydrophobic open-porous additive, i.e. having a water contact angle between 90° and 180°, obtained e.g. by a siloxane treatment. However, such hydrophobic additives tend to float on aqueous media, which can cause problems when processing the dry blend.

The following are examples of materials suitable as open-porous additives in the context of the present invention:

| Inorganic | Organic |
| --- | --- |
| Perlite | Foamed polystyrene |
| Expanded glass | Wood chips |
| Expanded shale | Superabsorbers (Superabsorbent Polymers, SAP) |
| Clay brick chips | Superabsorbing starch products |
| Quartz sand | |
| Sepiolite | |
| Cinder | |
| Foamed clay | |
| Vermiculite | |
| Limestone sand | |
| Fly ash | |
| Lava | |
| Bottom ash | |
| Foam glass | |
| Pit sand | |

According to a particularly preferred embodiment, the open-porous additive is pumice.

According to a further embodiment, the open-porous additive has a relative water absorption capacity by weight ranging from 1.1 to 2.5, preferably from 1.8 to 2.0. In the present context, "relative water absorption capacity by weight" refers to the amount of water that can be fully absorbed by a defined amount of the open-porous additive, i.e. without leaving any evident liquid water, expressed in term of weight ratio, i.e. weight of the absorbed water divided by the weight of the dry absorber.

According to another aspect of the invention, there is provided a self-supporting, thermally insulating rendering, consisting essentially of:
  60 to 90 Vol.-% of a hydrophobized granular silica aerogel;
  0.5 to 30 Vol.-% of a hardened purely mineral binder;
  0.2 to 20 Vol.-% of an open-porous water-insoluble or slowly water soluble additive having an accessible pore volume from 10 to 90 Vol.-%;
  up to 5 Vol.-% reinforcing fibers; and
  up to 5 Vol.-% processing additives; and having a thermal conductivity not exceeding 38 mW m$^{-1}$ K$^{-1}$.

It shall be understood that the above mentioned upper limit of the thermal conductivity applies for the dried rendering, which typically is reached after a drying period of 28 days, whereby the binder is hardened.

According to a favorable embodiment, the open-porous additive has an acces-sible pore volume ranging from 45 to 55 Vol.-%.

According to an advantageous embodiment, the thermal conductivity does not exceed 33 mW m−1 K−1. Preferably it does not exceed 30 mW m−1 K−1, and most preferably it does not exceed 28 mW m−1 K−1.

According to a further aspect of the invention, there is provided a method for producing an element of the self-supporting, thermally insulating rendering as defined above, the method comprising the steps of:
a) providing a first amount of a dry blend;
b) combining the same with a second amount of water to form a slurry;
c) shaping the slurry to a predetermined form of the shaped element; and
d) allowing the slurry to harden, thereby obtaining said shaped element;
   wherein at least said step b) and c) are carried out at an overpressure of 0.5 to 25 bar relative to atmospheric pressure.

According to an advantageous embodiment, the method steps b) and c) are carried out at an overpressure in the range of 2 to 15 bar, preferably in a range of 4 to 10 bar.

Although the self-supporting, thermally insulating rendering element is conveniently applied by means of known plastering equipment, it could also be produced by manual techniques.

Moreover, although the dry blend according to the present invention is particularly suited for forming self-supporting thermally insulating layers or elements, it could also be used to produce non-self-supporting coatings, e.g. by forming horizontally within a suitable frame arrangement.

BRIEF DESCRIPTION OF THE DRAWINGS

The above mentioned and other features and objects of this invention and the manner of achieving them will become more apparent and this invention itself will be better understood by reference to the following description of various embodiments of this invention taken in conjunction with the accompanying drawing, wherein is shown:
FIG. 1: Thermal conductivity of different rendering mixtures as a function of pressure (relative to atmospheric pressure), wherein:
   "Mixture A" is a cement based mixture without open-porous additive,
   "Mixture B" is a mixture without cement binder and without open-porous additive; and
   "Mixture C" is the same as mixture B but with the inclusion of an open-porous additive.

DESCRIPTION OF THE PREFERRED EMBODIMENTS

Examples

The various components such as a hydrophobized granular silica aerogel, a mineral binder, an open-porous additive and any processing additives are blended manually or by means of industrial mixing equipment in-factory, and the dry blend thus obtained is packed into sacks for delivery. On the construction site, the dry blend is mixed with a predetermined amount of water and processed by means of commercially available mixer for a predetermined time to form a homogeneous mass. After a predetermined mixing pause, the mass is mixed further and can subsequently be applied by conventional plastering equipment to form a single layer with a thickness of about 20 to 80 mm.

Alternatively, the above formed dry blend is mixed on the construction site with a predetermined amount of water and applied as a layer of 20 to 80 mm by means of a commercially available spray plastering machine and subsequently evened off by conventional tools.

A thermally insulating base with an aerogel blend as described above can be applied with the following steps:
1) apply pre-spray preparatory mortar;
2) apply aerogel based thermally insulating rendering layer;
3) apply reinforcing layer;
4) apply final rendering and paint finish A useful dry blend for producing a thermally insulating rendering comprises:
   hydrophobized granular silica aerogel (84.5 Vol-%)
   mineral binder: white cement (6 Vol-%) and hydrated lime (1.5 Vol-%)
   pumice as open porous additive (2 Vol-%)
   polyethylene fibers (1 Vol-%)
   organosilane hydrophobizing agent (1.25 Vol-%)
   processing additives: citric acid and dispersing agents (3.75 Vol-%)

The invention claimed is:

1. A dry blend for producing a thermally insulating rendering, consisting essentially of:
   60 to 90 Vol.-% of a hydrophobized granular silica aerogel;
   0.5 to 30 Vol.-% of a purely mineral binder;
   0.2 to 20 Vol.-% of an open-porous water-insoluble or slowly water soluble additive having an accessible pore volume from 10 to 90 Vol.-%;
   up to 5 Vol.-% reinforcing fibers;
   up to 5 Vol.-% of processing additive; and,
   wherein said open-porous additive is pumice.

2. A dry blend for producing a thermally insulating rendering, consisting essentially of:
   60 to 90 Vol.-% of a hydrophobized granular silica aerogel;
   0.5 to 30 Vol.-% of a purely mineral binder;
   0.2 to 20 Vol.-% of an open-porous water-insoluble or slowly water soluble additive having an accessible pore volume from 10 to 90 Vol.-%;
   up to 5 Vol.-% reinforcing fibers;
   up to 5 Vol.-% of processing additive;
   wherein said open-porous additive has a particle size from 0.04 to 4 mm; and,
   wherein said open-porous additive is pumice.

3. A dry blend for producing a thermally insulating rendering, consisting essentially of:
   60 to 90 Vol.-% of a hydrophobized granular silica aerogel;
   0.5 to 30 Vol.-% of a purely mineral binder;
   0.2 to 20 Vol.-% of an open-porous water-insoluble or slowly water soluble additive having an accessible pore volume from 10 to 90 Vol.-%;
   up to 5 Vol.-% reinforcing fibers;
   up to 5 Vol.-% of processing additive;
   wherein said open-porous additive has an accessible pore volume from 45 to 55 Vol.-%; and,
   wherein said open-porous additive is pumice.

4. The dry blend according to claim 1, wherein said open-porous additive has a relative water absorption capacity by weight ranging from 1.1 to 2.5.

* * * * *